Nov. 19, 1957  J. M. SCHMIED  2,813,465
RECEPTACLE MAKING APPARATUS
Filed Nov. 14, 1955  7 Sheets-Sheet 1

INVENTOR.
Joseph Mathias Schmied
BY
Atty.

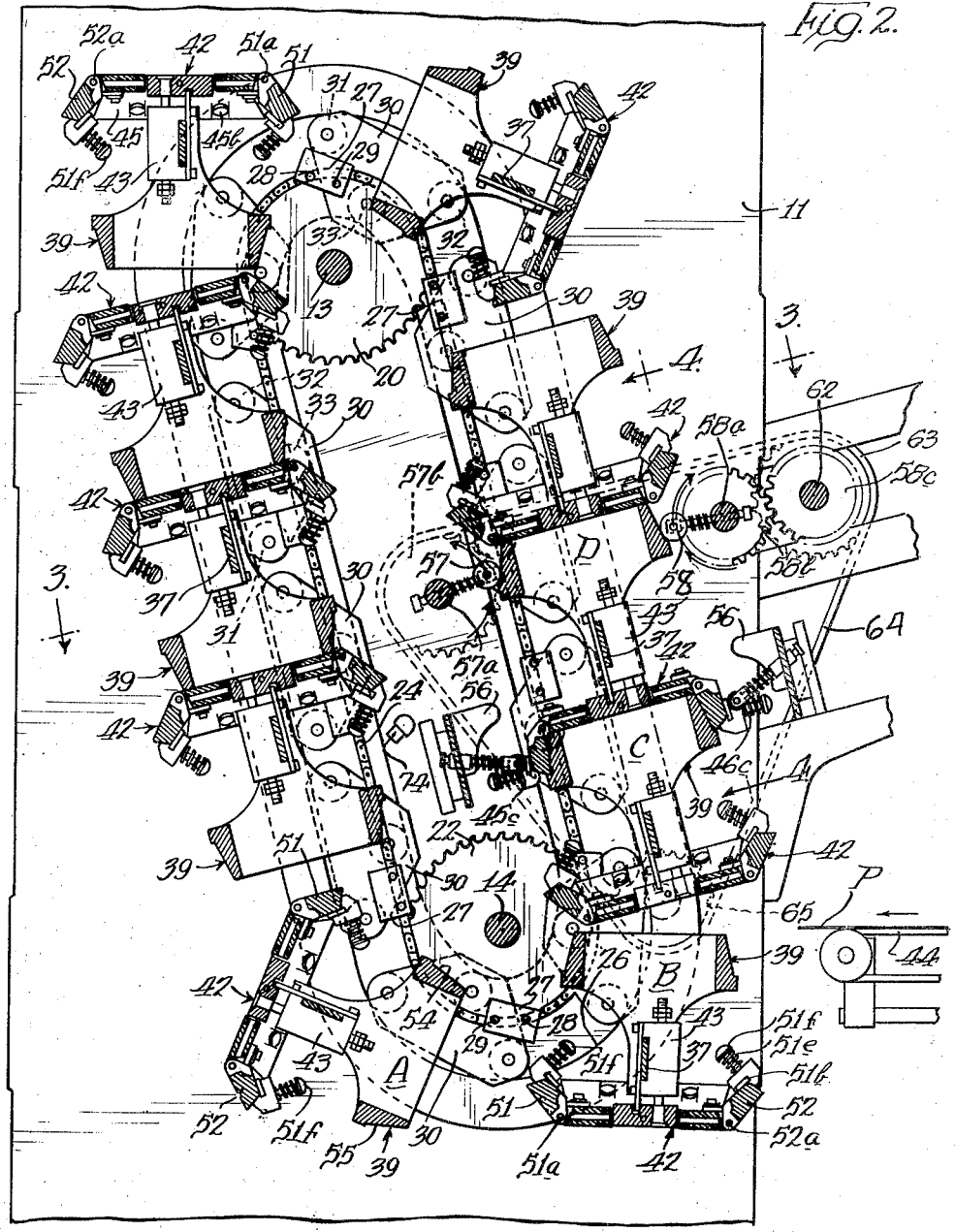

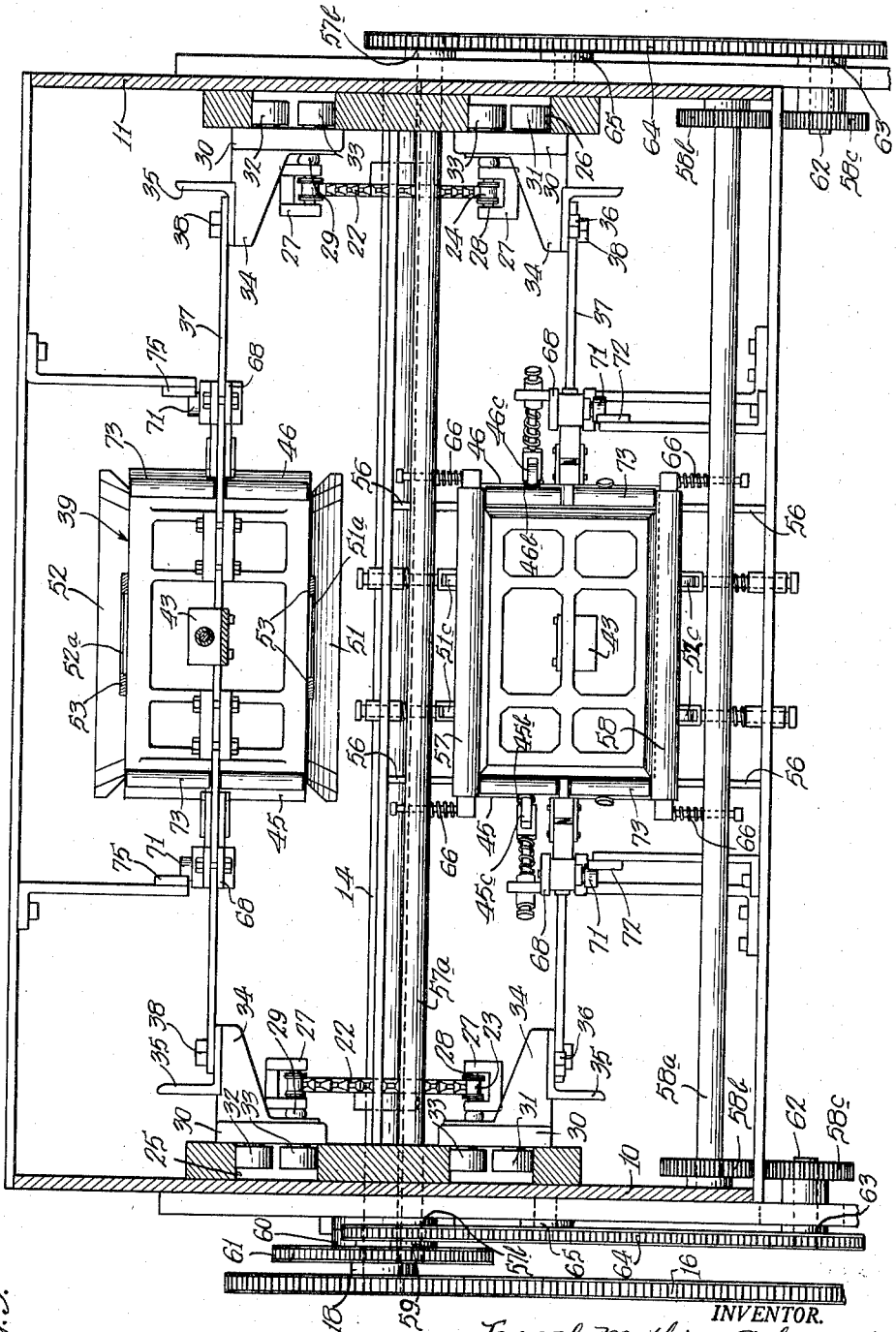

Nov. 19, 1957    J. M. SCHMIED    2,813,465
RECEPTACLE MAKING APPARATUS
Filed Nov. 14, 1955    7 Sheets-Sheet 4
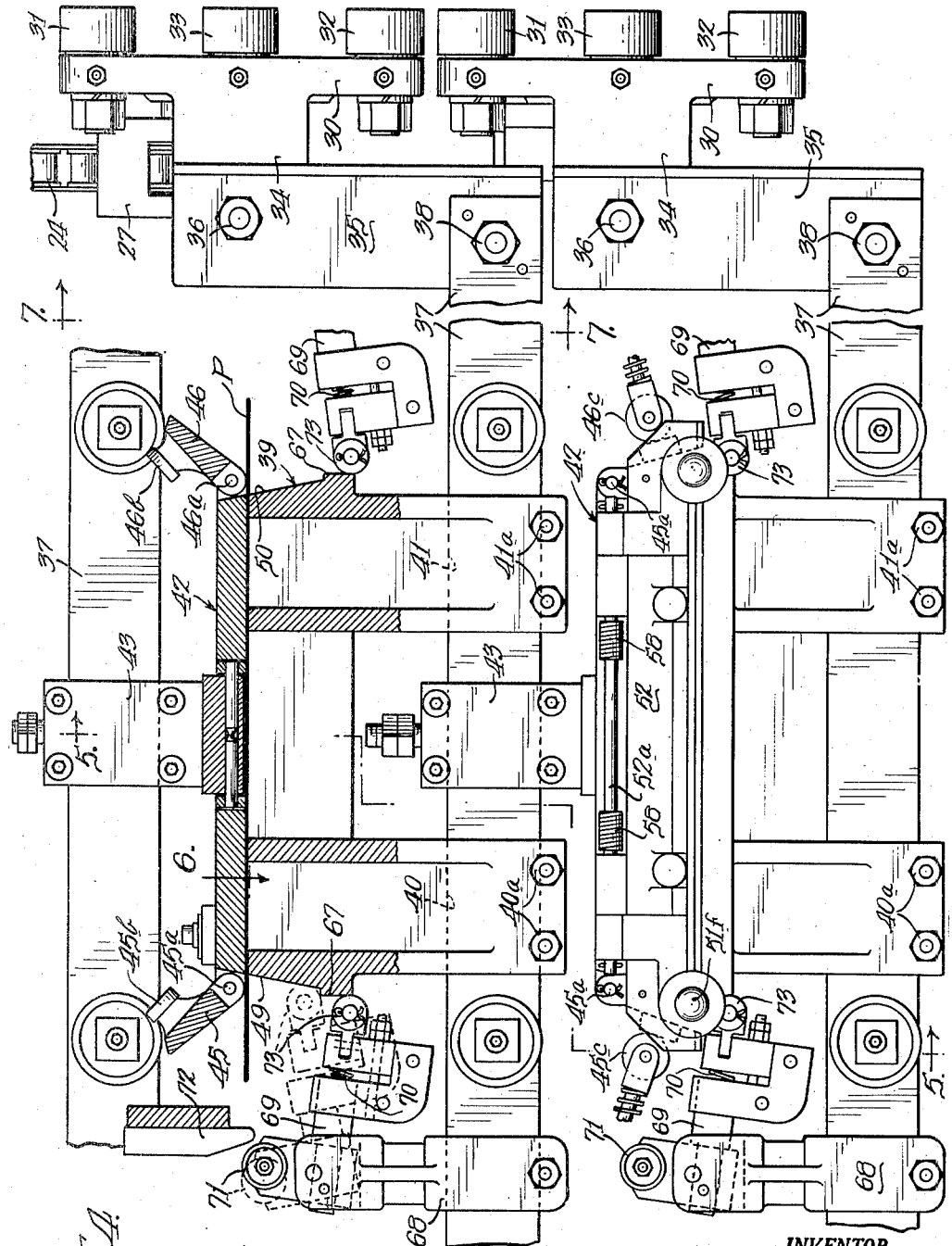
INVENTOR.
Joseph Mathias Schmied
BY
Atty:

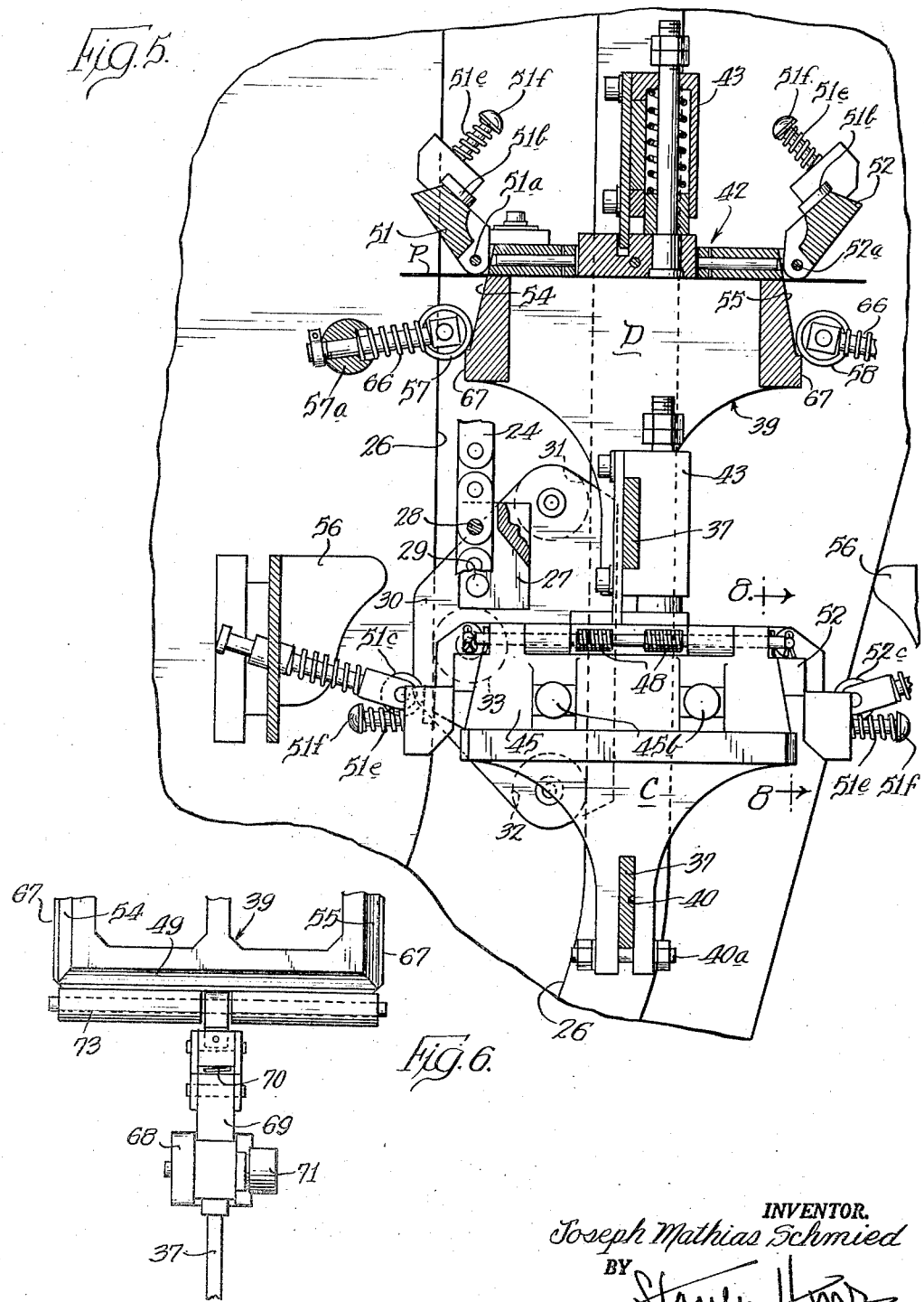

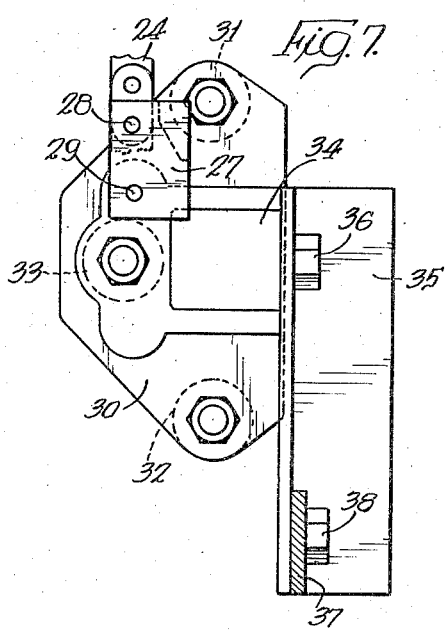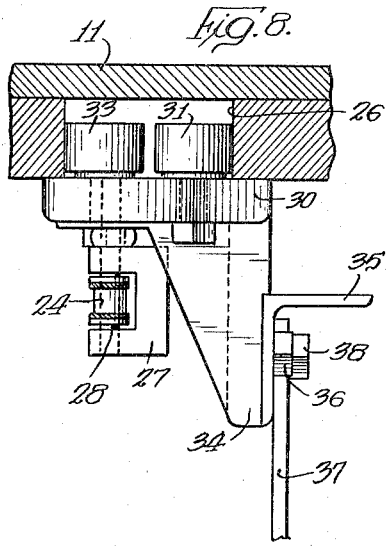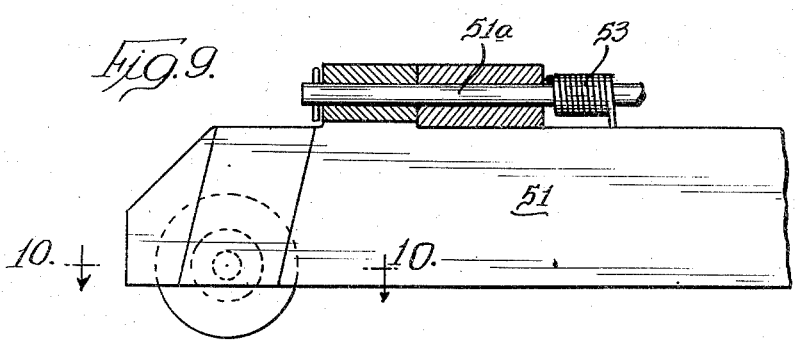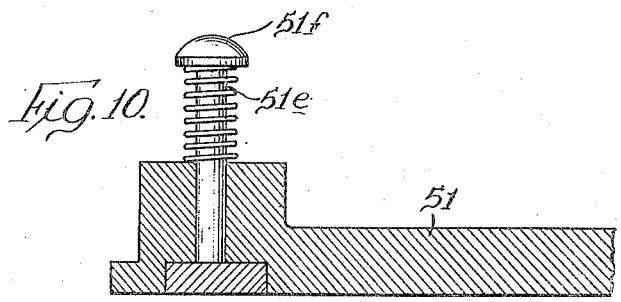

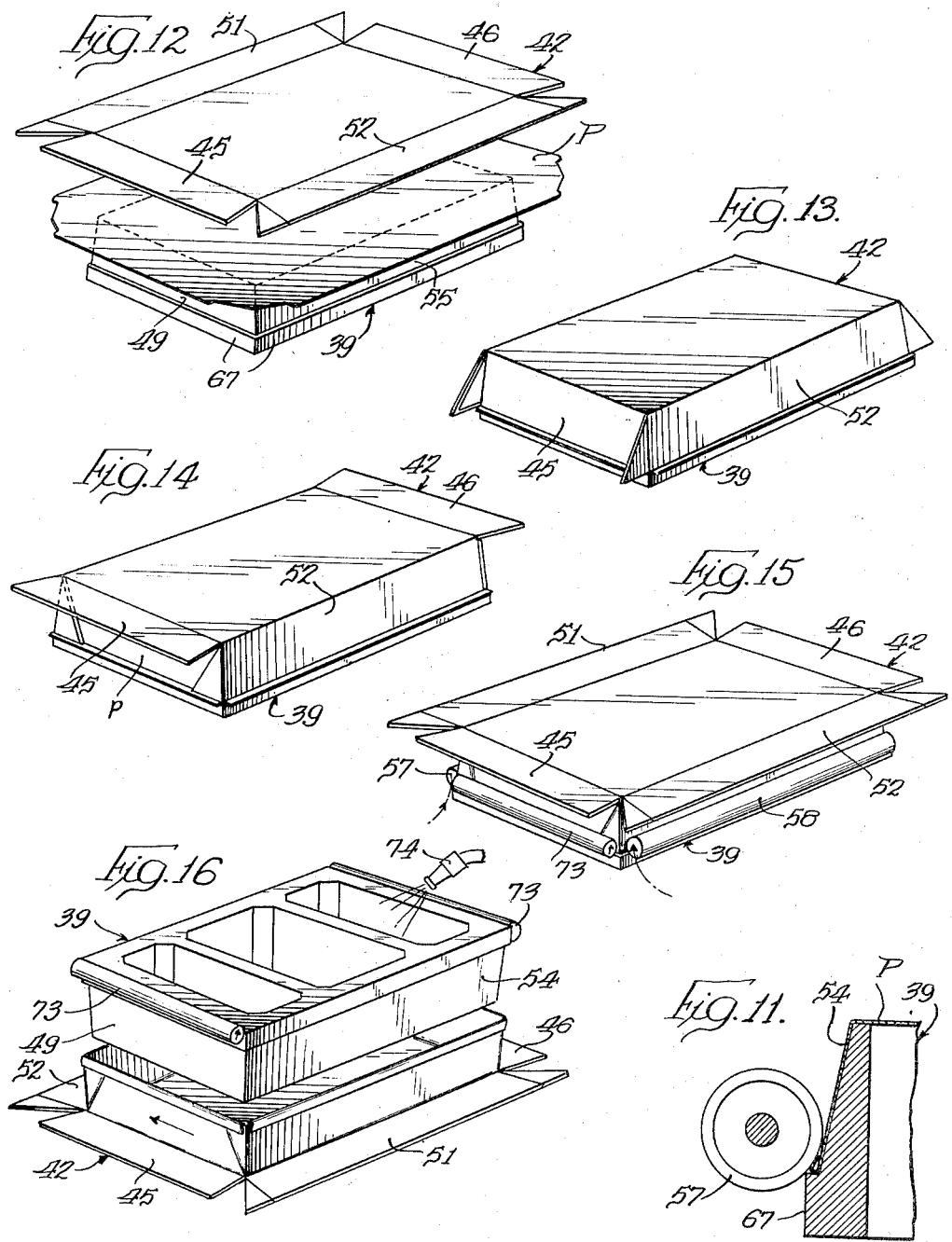

United States Patent Office 2,813,465
Patented Nov. 19, 1957

2,813,465

RECEPTACLE MAKING APPARATUS

Joseph Mathias Schmied, Chicago, Ill., assignor, by mesne assignments, to Ekco-Alcoa Containers, Inc., River Grove, Ill., a corporation of Illinois Application November 14, 1955, Serial No. 546,587

18 Claims. (Cl. 93—44)

This invention relates to receptacle making apparatus and more particularly pertains to a machine for folding a substantially flat sheet metal blank into the form of a receptacle having integrally connected side, end and bottom walls.

The present invention provides a machine of the character indicated wherein the blank is claimped against a mandrel supported on a travelling carrier, and means adjacent the path of the carrier engage portions of the blank in outlying relation to the clamped portion of the blank to bend said portions against faces of the mandrel opposite thereto to form the side and end walls of the receptacle.

The invention presents numerous features of advantage and has other objects, all of which will more clearly appear from the following description when read in connection with the accompanying drawings, wherein:

Fig. 2 is an enlarged fragmentary vertical section of the carrier and the blank folding mechanism.

Fig. 3 is an enlarged sectional view taken downwardly on lines 3—3 of Fig. 2, with parts in elevation.

Fig. 4 is an enlarged fragmentary detail view of the apparatus when viewed from the front side of said apparatus as indicated at 4—4 on Fig. 2.

Fig. 5 is an enlarged fragmentary vertical section taken on line 5—5 of Fig. 4.

Fig. 6 is a similar view taken on line 6—6 of Fig. 4.

Fig. 7 is a detail view of the bracket connecting the folding apparatus to the carrier as indicated at 7—7 on Fig. 4.

Fig. 8 is an enlarged detail view of the apparatus shown in Fig. 7 as the same appears in the upper right hand portion of Fig. 3.

Fig. 9 is a detail view of the mechanism for folding the corner webs of the formed receptacles as indicated at 8—8 of Fig. 5.

Fig. 10 is a section taken on line 10—10 of Fig. 9.

Fig. 11 is an enlarged fragmentary view showing the action of the blank edge portions and the mechanism cooperating therewith as shown by the step illustrated in Fig. 16.

Figure 1:
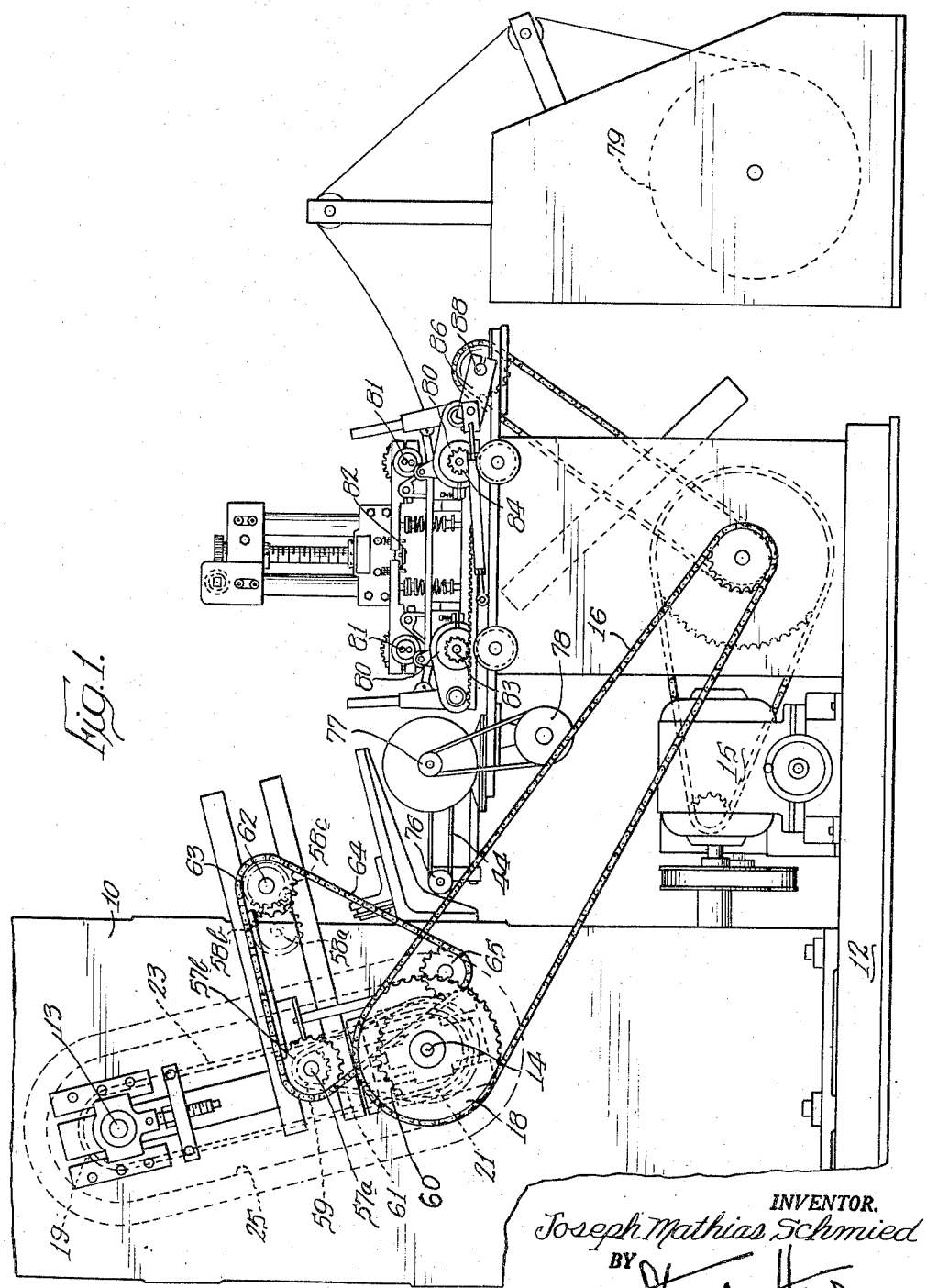
Fig. 1 is a view in side elevation of a machine embodying the features of this invention.

Figs. 12 to 16 inclusive are diagrammatic views illustrating steps in the development of the blank into a formed receptacle in accordance with the present invention.

The apparatus of this invention embodies a stationary frame including duplicate oppositely disposed side walls 10 and 11 of cast metal construction which rise upwardly from a base 12 to which the lower ends of said side walls are rigidly secured.

A sprocket supporting shaft 13 is rotatably journaled in the opposite side walls of the frame adjacent the upper end of said frame and a sprocket supporting shaft 14 is also journalled in the side walls in downwardly spaced parallel relation to the shaft 13. Shaft 14 is extended beyond the outer face of side wall 10 of the frame to provide for connection with a power source such as a motor 15 through a chain 16 which passes over a motor driven sprocket 17 and a sprocket 18 secured to the aforesaid extended portion of the shaft 14.

A pair of sprockets 19 and 20 are fixedly secured to the shaft 13 in spaced apart relation axially of the shaft 13 and a similar pair of sprockets 21 and 22 are secured in the same manner to the shaft 14 whereby the sprockets 19 and 21 and the sprockets 20 and 22 provide two pairs of sprockets aligned lengthwise of the side walls 10 and 11 for the reception of an endless chain 23 around the sprockets 19 and 21 and a second endless chain 24 around the sprockets 20 and 22.

Thus the chains 23 and 24 are driven through the sprockets 20 and 22 on the shaft 14 by reason of the connection of the shaft 14 with the motor 15 of the power unit and each chain accordingly moves in an orbital path having two straight runs and an arcuate portion at each end connecting the straight runs. The side wall 10 is provided with a channel 25 facing the side wall 11 and the side wall 11 is provided with a channel 26 facing the side wall 10 which channels cooperate to provide a pair of continuous tracks each having a pair of straight runs and a pair of curved ends in transverse alignment with the path of the chains 23 and 24. Each track or guideway provided by the channels 25 and 26 has camming engagement with rollers on rocking brackets pivotally connected to the chains 23 and 24 whereby a series of such rocking brackets connected to the chains 23 and 24 in aligned pairs transversely of the path of said chains and at uniformly spaced distances apart linearly of chains are adjustably positioned in selected rocked position relative to the chains as the chains are driven about the sprockets. As shown in Fig. 8, each chain and bracket assembly comprises a link 27 which straddles the chain associated therewith and held on the chain by a pivot pin 28 which passes through the link 27 as well as the link of the chain. A second pivot pin 29 projecting from the side of the link 27 facing the space between the chains 23 and 24, provides a mounting for a bracket 30 through which the bracket has rocking movement relative to the link 27 about an axis parallel to the axes of oribital movement of the chain. A pair of rollers 31 and 32 supported on bolts 31ª and 32ª respectively secured to the bracket 30 have engagement with the channel associated therewith along the innermost edge of the channel while a third roller 33 supported on a bolt 33ª secured to the bracket 30 has engagement with the opposite edge of the channel. Thus the opposite edges of the channel provide cams which control the oscillation of the brackets into predetermined positions as the brackets are caused to travel in unison with movement of the chains.

Each bracket 30 as shown in Figs. 7 and 8 is provided with an extension in the form of an arm 34 which projects in the direction of the bracket 30 in transverse alignment therewith, and a bar 35 secured to the inwardly projecting end of each arm 34 by suitbale means such as a bolt 36 and extending lengthwise of the path of the chain associated therewith and having an end portion offset from the bracket in the trailing relation to movement of the bracket as it is driven by said chain and a similar bar 35 secured to the arm 34 of the bracket 30 in transverse alignment therewith one connected by a rigid bridge member or hanger bar 37 arranged parallel to the axes of orbital movement of the chains 23 and 24. A bolt 38 or other suitable fastening establishes connection between said hanger bar and the arms 34 of each pair of transversely aligned brackets 30. Each hanger bar 37 provides support for a mandrel 39 by means of pair of shanks 40 and 41 having forked ends straddling the bar 37 in spaced apart relation lengthwise of the bar 37 and fastened thereto by bolts 40ª and 41ª respectively. Each mandrel 39 is of such contour as to present faces corresponding to the walls of the receptacle to be formed from a blank P positioned thereon with the bottom wall forming face of the mandrel in parallel relation to the longitudinal axis of the hanger bar 37 associated therewith and facing the next hanger bar 37 in leading relation thereto as said bars 37 move in response to forward travel of the chains 23 and 24. Each hanger bar 37 also provides support for a clamping head 42 by means of a shank 43 having forked ends straddling the bar 37 midway of the distance between the forked ends of the shanks 40 and 41 of the mandrel 39 also secured to said bar 37. Each clamping head 42 presents a working surface facing the bottom wall forming face of the mandrel 39 supported on the hanger bar 37 in trailing relation thereto as said bars 37 move in response to forward travel of the chains 23 and 24. The spacing of each aligned pair of brackets 30 relative to each neighboring pair of brackets 30 is such that each clamping head 42 and the mandrel 39 in trailing relation to said clamping head 42 cooperate to clamp the bottom wall forming portion of a blank P against the corresponding face of the mandrel 39 when the rollers carried by the bracket 30 associated with the bars 37 supporting said associated clamping head 42 and mandrel 39 are so engaged by the edges of the cooperating channels 25 and 26 as to travel in a straight path as shown by the cooperating clamping heads and mandrels arranged in meeting relation in Fig. 2, along the stragiht runs of the chains.

As viewed in Fig. 2 the sprockets are driven in counter-clockwise direction whereby the right hand straight run of the chains moves upwardly and the left hand straight run moves downwardly. While travelling around the lower curved end of the run of the chains, the rollers carried by the brackets 30 are engaged by the corresponding portion of the channel to rock the clamping head downwardly and outwardly away from the cooperating mandrel (as shown in position A in Fig. 2) as the portion of the chain to which the bracket is joined enters meshing relation with the lower sprocket and operate to rock the next leading mandrel into a position (as shown in position B in Fig. 2) wherein the bottom wall forming face thereof is substantially coplanar with the upwardly facing run of a belt 44 forming part of a mechanism for successively feeding a metal blank P to the mandrels as each mandrel reaches said position B, whereby so as to clamp the bottom wall forming portion of the blank P against the mandrel under pressure of the clamping head opposite thereto when said mandrel and clamping head move upwardly from said blank feeding station, as shown in position indicated at C in Fig. 2. When thus clamped between the mandrel and clamping head, the marginal portion of the metal blank P in outlying relation to the bottom wall forming portion of the blank is in coplanar relation to said latter portion as shown in Fig. 10. A wing 45 hinged as at 45a to an edge of the clamping head facing the chain 23 and a similar wing 46 hinged as at 46a to the opposite edge of the clamping head (see Fig. 4) each swing between an outspread position and a folded position and springs 48 associated with each of said wings urge the associated wing into outspread position. When the wings 45 and 46 are moved into folded position, the marginal portions of the blank P underlying said wings are folded against the opposite faces 49 and 50 of the mandrel to form opposite end walls of the pan to be produced from the blank. A wing 51 hinged as at 51a to an edge of the clamping head extending lengthwise of the hanger bar 37 and a second wing 52 hinged as at 52a to the opposite edge of the clamping head (see Fig. 5) each swing between an outspread position and a folded position and springs 53 associated with each of said wings urge the associated swing into outspread position. Like the wings 45 and 46, when the wings 51 and 52 are moved into folded position, the marginal portions of the blank P underlying said wings are folded against the opposite faces 54 and 55 of the mandrel to form the opposite side walls of the final pan produced from said blank. The wings 45 and 46 each have projecting heads 45b and 46b respectively which cooperate with stationary cams 45c and 46c respectively secured to the opposite side walls of the frame (see Fig. 5) to cause the wings 45 and 46 to simultaneously swing toward folded position as the chains are driven to move the corresponding clamping member upwardly from position B to position C of Fig. 2. After having moved past the stationary cams 45c and 46c to permit the wings 45 and 46 to return to outspread position the clamping member in its further upward travel is located as indicated by position C as shown in Fig. 2, whereby projecting heads 51b and 52b respectively provided on the wings 51 and 52 are engaged by cams 51c and 52c in the path of the heads 51b and 52b to simultaneously swing the wings 51 and 52 into folded position.

While the cams 51c and 52c are operative to hold the wing members 51 and 52 in folded position, the corner connecting webs developed at the junction of the side and end walls of the blank P as shown in Fig. 5, are bent inwardly against the outer surface of the end wall of the blank adjacent thereto by a plunger 51e carried at opposite ends of the wings 51 and 52 for movement relative to the wings 51 and 52 in a path lengthwise of the axis of swinging movement of the wings 45 and 46 of the clamping member, between a retracted and advanced position. A spring associated with each plunger acts to bias the plunger into retracted position. When in retracted position, the end portion of the plunger facing the corner web of the blank to-be-bent thereby is substantially coplanar with the mandrel facing surface of the wing with which the plunger is associated. A head 51f at the outer end of each plunger 51e is engageable with a stationary cam 56 (see Fig. 5) to cause the plunger 51e to move from retracted to advanced position whereby the corner web opposite the plunger is bent inwardly against the end wall of the blank adjacent thereto as the blank P appears in Fig. 15.

After having moved past the cams 51c and 52c to permit the wings 51 and 52 to return to outspread position, further upward travel of the clamping member brings the cooperating mandrel into a position indicated at D in Fig. 2 wherein a revolving cam 57 opposite the face 54 of the mandrel and a similar cam 58 opposite the face 55 of the mandrel each have upward engagement with the lower edge portion of the side walls of the blank to form an upwardly bent hem along said edge portions of the side walls as shown in Fig. 11. A shaft 57a carrying the cam 57 is provided with a sprocket 59 (see Fig. 1) and counterclockwise rotation of the shaft 14 operates to drive the shaft 57a in the same direction through a chain 61 connecting a sprocket 60 on the shaft 14 and the sprocket 59 on the shaft 57a.

A counter shaft 62 provided with a sprocket 63, and a chain 64 trained about said sprocket 63, a second sprocket 57b on the shaft 57a and an idler sprocket 65 is thereby driven by the rotation of the shaft 57a. A gear 58b on the shaft 58a has intermeshing engagement with a gear 58c on the shaft 62 so as to rotate the shaft 58a carrying the cam 58 as the shaft 62 is accordingly driven by the chain 64. It will be noted in Fig. 5 that a spring 66 associated with the cam 57 and a similar spring 66 associated with the cam 58 operate to urge the cams in the direction of the face of the mandrel opposite thereto so as to firmly press the hem of the blank against the side wall portion of the blank underlying said hem. The position of the edge portion of the blank so as to project from the mandrel and thereby assure upward engagement by the cams 57 and 58 is controlled by an outward offset 67 presented by the faces of the mandrel at a distance spaced upwardly from lower limits of said faces. Thus the edge portion of the blank is folded back upon itself along a fold line coincident with the corner defining the junction between said offset 67 and the face portion of the mandrel extending upwardly therefrom. The lower edge portion of the marginal portions of the blank folded against the opposite faces 49 and 50 of the mandrel are likewise subjected to a rebending operation to produce a similar hem along the corresponding edges of the pan produced from said blank. Such action is provided by camming means secured to the hanger bar 37 which supports the mandrel associated with said blank. Supported on each hanger bar 37 on opposite sides of the mandrel connected thereto is a bracket 68 (Fig. 4) and each bracket 68 provides pivotal support for one end of an arm 69 having its opposite end extending in the direction of the mandrel. Each arm 69 has limited rocking movement about an axis parallel to the face of the mandrel opposite thereto between retracted and advanced rocked positions on opposite sides of a plane through its axis and parallel to the longitudinal axis of the hanger bar associated therewith. A spring 70 acts on the arm to bias the same into one of said rocked positions as it is moved through said plane in either direction. An extension of the arm 69 is provided with a roller 71 engageable with a stationary cam 72 to rock the arm from retracted to advanced rocked positions as shown in Fig. 4, wherein the advanced position is shown in dotted lines. As the arm 69 is thus rocked from retracted to advanced position, rollers 73 mounted at the end of the arm facing the mandrel are moved upwardly to engage the edge portion of the blank which overhangs the offset 67 in the face of the mandrel opposite thereto to fold such edge portion of the blank upon itself and thereby form the hem. Thus the rollers 73 carried by the arms 69 like the cams 57 and 58 which cooperate with the faces 54 and 55 of the mandrel, operate to produce a hem along the edges of the pan produced from said blank.

The rollers 73 remain in such advanced position through the biasing action of the spring so as to thereby trap the blank P against escape from the mandrel while the mandrel is rounding the bend at the curved upper end of its path of travel under control of the chains 23 and 24, and while the blank is in downward relation to the mandrel during downward travel of the mandrel. When the mandrel reaches a position opposite a doffing air jet 74, the roller 71 of the arm associated with the rollers 73 is engaged by a second stationary cam 75 to rock the arm 69 from advanced to retracted position and thereby free the blank from the holding action of the rollers 73 and to permit the pan to fall from the mandrel for delivery to suitable pan stacking facilities.

The belt 44, on the upper run of which the blanks P are successively delivered to a mandrel positioned in alignment therewith, is supported on pulleys 76 and 77, driven through suitable connections by a motor 78. The blanks P are delivered to the belt 44 by a cutting mechanism which separates the blanks P from a strip of foil supplied by a reel 79. The strip of foil thus supplied by the reel 79 is threaded between two pairs of superposed feed rollers 80 and 81 so as to present a portion of the strip in the area between said rollers in the path of a vertically reciprocating cutter 82. Counterclockwise movement of pinions 83 and 84 associated with the lower rollers 80 is effective to advance the strip into the path of the cutter 82 and to advance a severed blank P onto the upper run of the belt 44. Such counterclockwise rotation of the pinions is provided by a rack 85 which reciprocates horizontally between advanced and retracted positions under control of crank 86 connected by link 87 to the rack 85 and fixed to a shaft 88 journalled for rotation about an axis parallel to the axes of the rollers 80 and 81, and driven under power supplied by the motor 15 which also drives the chains 23 and 24 of the pan forming mechanism. The pinions have free running connection with the shafts of the rollers 80 through suitable clutch mechanism so as to move clockwise without effecting corresponding movement of the rollers 80. Thus the rack 85 and pinions 83 and 84 cooperate to intermittently advance the strip and the severed blank upon movement of the rack 85 from retracted position to advanced position (corresponding to movement from left to right as viewed in Fig. 1) and the rollers 80 and 81 are stationary during movement of the rack 85 from advanced to retracted position in preparation for the next cycle of movement to advance the strip and the severed blank.

The linear speed of the chains 23 and 24 through which the mandrels are successively stationed in blank receiving relation to the blank delivery belt 44, is so conformed to the speed of the rack 85 so that the arrival of the mandrel in such blank receiving station is correlated with the arrival of a blank on the belt 44.

The present invention accordingly provides a mechanism wherein a series of rapid but correlated operations is provided for the production of receptacles of the class indicated.

What is claimed is:

1. An apparatus for folding a substantially flat blank into the form of a receptacle having integrally connected side, end and bottom walls comprising a mandrel having faces corresponding to said walls of the receptacle to be formed from said blank, an endless carrier on which said mandrel is supported for movement in an orbital path with the bottom wall forming face of the mandrel in parallel relation to the axis of said orbital path, a clamping head connected to said carrier for movement relative to the carrier about an axis parallel to said latter face of the mandrel toward and away from a selected position relative to said mandrel, said clamping head, when in said selected position, cooperating with said mandrel to clamp the bottom wall forming portion of the blank against said latter face of the mandrel, wings hinged to said clamping head for movement relative to said clamping head between an outspread position and a folded position and normally biased into outspread position, said faces of the mandrel corresponding to the side and end walls of the receptacle to be formed from said blank, and said wings, when in folded position, cooperating to bend the portions of the blank in outlying relation to the bottom wall portion of the blank along their connection with said latter portion of the blank to form the side and end walls of the receptacle, and means adjacent the path of the carrier engageable by said wings to move the latter from outspread to folded position during movement of the carrier.

2. An apparatus in accordance with claim 1 wherein the endless carrier is supported for movement in an orbital path about a horizontal axis.

3. An apparatus in accordance with claim 1 wherein the endless carrier is supported for movement in an orbital path about vertically spaced horizontal axes, and the means engaging the wings to move the latter from outspread to folded position are located adjacent the upwardly moving portion of the carrier.

4. An apparatus in accordance with claim 1 wherein said apparatus includes a continuous track having a straight run and curved ends, and said carrier includes a carriage through which the clamping head is connected to the carrier, and said carriage has engagement with said track to move and hold said clamping head in said selected position throughout the length of said straight run of the track.

5. An apparatus in accordance with claim 1 wherein said apparatus includes a continuous track having a straight run and curved ends aligned transversely with a similar track in spaced parallel relation to said first track, said carrier being supported for movement in the space between said tracks, and means for supporting said clamping head on said carrier including a carriage spanning the space between said tracks and engageable at opposite ends with said tracks to move and hold said clamping head in said selected position throughout the length of said straight run of said tracks.

6. An apparatus in accordance with claim 1 wherein said apparatus includes a continuous track having a straight run and curved ends, and said carrier includes a carriage through which the clamping head is connected to the carrier, and said carriage has engagement with said track to move and hold said clamping member in said selected position throughout the length of said straight run of the track and to move and hold said clamping head out of said selected position when said carriage engages the curved ends of said track.

7. An apparatus in accordance with claim 1 wherein the clamping head is in leading relation to the mandrel.

8. An apparatus in accordance with claim 1 wherein the bottom wall forming face of the mandrel is in upwardly facing position during movement of the clamping head toward said selected position.

9. An apparatus in accordance with claim 1 wherein the bottom wall forming face of the mandrel is in upwardly facing position during movement of the clamping head toward said selected position and said apparatus includes means for depositing a blank between said mandrel and clamping head during movement of the clamping head toward said selected position.

10. An apparatus in accordance with claim 1 wherein the end wall forming wings complete a cycle of movement toward and away from a folded position prior to initiation of a similar cycle of movement by the side wall forming wings.

11. An apparatus in accordance with claim 1 wherein the side and end walls formed in the blank through operation of said wings into folded position develop corner connecting webs at the junction of said side and end walls, and means supported on the side wall forming wings for movement relative to said wings in a path lengthwise of the axis of swinging movement of the end wall forming wings are operable to bend each of said webs inwardly against the outer surface of the end wall adjacent thereto while the side wall forming wings are in folded position.

12. An apparatus in accordance with claim 1 wherein the side and end walls formed in the blank through operation of said wings into folded position develop corner connecting webs at the junction of said side and end walls, and means supported on the side wall forming wings for movement relative to said wings in a path lengthwise of the axis of swinging movement of the end wall forming wings are operable to bend each of said webs inwardly against the outer surface of the end wall adjacent thereto while the side wall forming wings are in folded position, said apparatus also including means engageable with edge portions of the side and end walls upon completion of a cycle of movement of said wing members toward and away from a folded position to fold said edge portions against the outer surface of said walls surrounded by said edge portions to provide a turned over rim at the upper limits of said walls.

13. An apparatus in accordance with claim 1 wherein a cam member is supported for rotating movement relative to the mandrel opposite thereto about an axis parallel to the path of travel of the carrier between advanced and retracted positions, said apparatus also including means for driving the carrier, and means controlled by said carrier driving means for moving said cam between retracted and advanced positions in predetermined synchronized relation to the travel of the carrier whereby the outer edge portion of the blank carried on said mandrel when said mandrel is positioned opposite said cam is engaged by said cam when the latter is in advanced position to cause said edge portion of the blank to be bent upwardly upon itself in the form of a hem.

14. An apparatus in accordance with claim 1 wherein said apparatus includes an arm supported on said carrier for rocking movement relative to said carrier between retracted and advanced positions about an axis parallel to the axis of movement of an opposed pair of said wings, a stationary cam in the path of the carrier engageable with said arm to rock the arm from retracted to advanced position, a second stationary cam in the path of the carrier engageable with said arm to rock the arm from advanced to retracted positions, said clamping head being movable away from a selected position relative to said mandrel during travel of the carrier from a position wherein said arm is engaged by said first cam and a position wherein said arm is engaged by said second cam, and pan blank engaging means at the swinging end of said arm operable to engage and reversely bend an edge portion of the blank carried by said mandrel when said arm is engaged by the first cam and to trap the blank against removal from the mandrel pending travel of the carrier to position said arm for engagement by said second cam.

15. An apparatus in accordance with claim 14 wherein a spring is operable to urge said arm away from a position between said retracted and advanced positions.

16. In an apparatus as described in claim 1 wherein said apparatus includes means for depositing a blank between said mandrel and clamping head including a belt supported on pulleys with the upper run of said belt in alignment with the bottom wall forming face of the mandrel when the clamping head associated with said mandrel is away from said selected position, and means for delivering said blank to said belt including a pair of rollers between which said blank is moved toward said belt in timed relation to the arrival of said mandrel at said position wherein its bottom wall forming face is in alignment with said belt.

17. In a foil receptacle making apparatus a vertical reciprocating cutter and a foil reel from which a band of foil may be drawn into the path of the cutter, means for feeding said band into the path of said cutter, a conveyor having an upwardly facing surface on to which a blank severed from said strip by said cutter is carried away from said cutter, means at the discharge end of said conveyor for receiving a blank discharged from said conveyor including a mandrel having faces corresponding to walls of the receptacle to be formed from said blank, an endless carrier on which said mandrel is supported for movement in an orbital path with the bottom wall forming face of the mandrel in parallel relation to the axis of said orbital path, a clamping head connected to said carrier for movement relative to the carrier about an axis parallel to said latter face of the mandrel toward and away from a selected position relative to said mandrel, said clamping head, when in said selected position, cooperating with said mandrel to clamp the bottom wall forming portion of the blank against said latter face of the mandrel, wings hinged to said clamping head for movement relative to said clamping head between an outspread position and a folded position and normally biased into outspread position, said faces of the mandrel corresponding to the side and end walls of the receptacle to be formed from said blank, and said wings, when in folded position, cooperating to bend the portions of the blank in outlying relation to the bottom wall portion of the blank along their connection with said latter portion of the blank to form the side and end walls of the receptacle, and means adjacent the path of the carrier engageable by said wings to move the latter from outspread to folded position during movement of the carrier.

18. An apparatus for folding a substantially flat blank into the form of a receptacle having integrally connected side, end and bottom walls, comprising a mandrel having faces corresponding to said walls of the receptacle to be formed from said blank, a carrier on which said mandrel is supported for movement in a fixed path, a clamping head connected to said carrier for movement relative to the carrier toward and away from a selected position relative to said mandrel, said clamping head, when in said selected position, cooperating with said mandrel to clamp the bottom wall forming portion of the blank against the bottom wall forming face of the mandrel, wings on said clamping head movable relative to said clamping head between an outspread position and a folded position and, normally biased into outspread position, said faces of the mandrel corresponding to the side and end walls of the receptacle to be formed from said blank and said wings, when in folded position, cooperating to bend the portions of the blank in outlying relation to the bottom wall portion of the blank along their connection with said latter portion of the blank to form the side and end walls of the receptacle, and means adjacent the path of the carrier engageable by said wings to move the latter from outspread to folded position during movement of the carrier.

No references cited.